United States Patent [19]

Conrad

[11] Patent Number: 4,475,741
[45] Date of Patent: Oct. 9, 1984

[54] THREE POINT SUSPENSION DEVICE FOR TRACTORS

[76] Inventor: Ernst Conrad, Westfeld 13, 3101 Nienhagen, Fed. Rep. of Germany

[21] Appl. No.: 269,715

[22] Filed: Jun. 2, 1981

[30] Foreign Application Priority Data

Jun. 3, 1980 [DE] Fed. Rep. of Germany ....... 3020947

[51] Int. Cl.³ .............................................. B60D 1/00
[52] U.S. Cl. ...................................... 280/482; 138/44;
280/456 A; 280/460 A; 280/461 A; 280/504;
280/508; 280/510
[58] Field of Search .......... 280/456 A, 460 A, 461 A,
280/478 A, 482, 504, 506, 509, 507, 510, 508;
292/207, 210, 173, DIG. 4; 137/409; 138/44;
92/51, 52, 53; 16/84; D10/70, 71, 72; 33/138,
161

[56] References Cited

U.S. PATENT DOCUMENTS

| D. 229,967 | 1/1974 | Quenot | D10/72 |
|---|---|---|---|
| 1,426,134 | 8/1922 | Weber | 280/510 |
| 1,558,879 | 10/1925 | Hoare | 33/161 |
| 1,690,919 | 11/1928 | Baine | 33/138 |
| 1,969,645 | 8/1934 | Glenn | 137/409 |
| 2,437,321 | 3/1948 | Hawkins | 280/456 A |
| 2,597,096 | 5/1952 | Harris | 280/509 |
| 2,679,827 | 6/1954 | Perdue | 92/51 |
| 2,691,963 | 10/1954 | Seng | 92/51 |
| 3,384,937 | 5/1968 | Muncke et al. | 280/482 |
| 3,572,763 | 3/1971 | Cannon et al. | 280/461 A |
| 4,236,613 | 12/1980 | van der Lely | 280/482 |

FOREIGN PATENT DOCUMENTS

| 7837172 | 12/1978 | Fed. Rep. of Germany . | |
| 2854188 | 6/1980 | Fed. Rep. of Germany | 280/482 |
| 1176642 | 4/1959 | France | 280/482 |
| 1200500 | 12/1959 | France | 33/161 |

OTHER PUBLICATIONS

Abstract of German Utility Model 78 37 172, dated Aug. 2, 1979.

Primary Examiner—David M. Mitchell
Assistant Examiner—Kenneth R. Rice
Attorney, Agent, or Firm—Robert E. Burns; Emmanuel J. Lobato; Bruce L. Adams

[57] ABSTRACT

In the case of the adjustable upper link in a three-point suspension device for a tractor, comprising a locking device in the form of a line fitted with a shut-off device and connecting together the two end-faces of the hydraulic cylinder, the invention simplifies the operation of the device in that it may be adjusted effortlessly from the tractor-seat. This is achieved in that the shut-off device is in the form of a ball-valve having an axis secured to a forked actuating lever, and in that springs are provided to urge the said actuating lever towards the shut-off position. A scale provides the tractor-driver with an accurate indication of the setting of the link. The design of a tube accommodating one end of the piston-rod as a compressed-air chamber ensures automatic displacement of the piston in the hydraulic cylinder.

21 Claims, 25 Drawing Figures

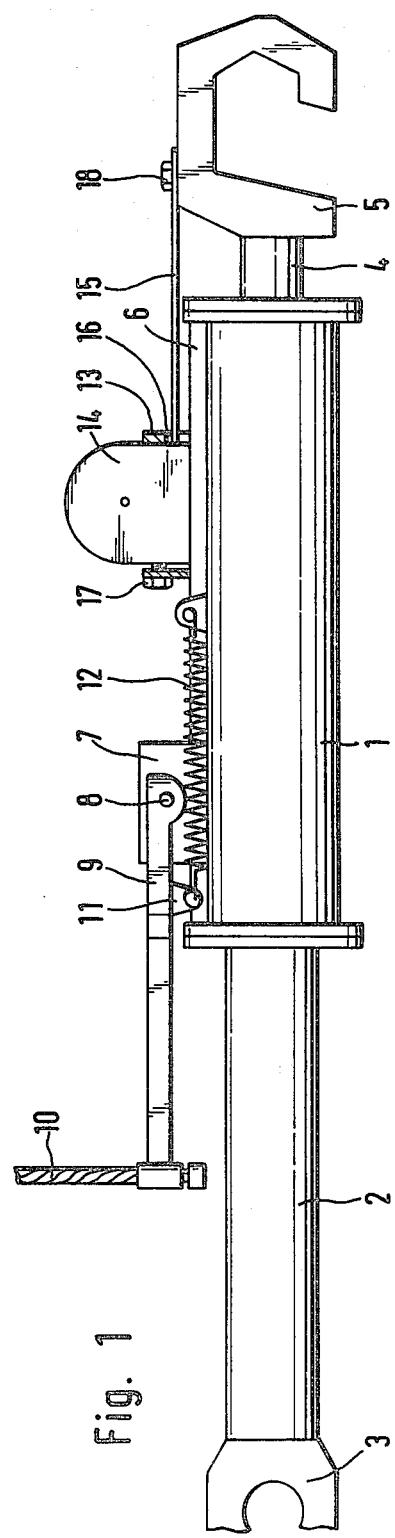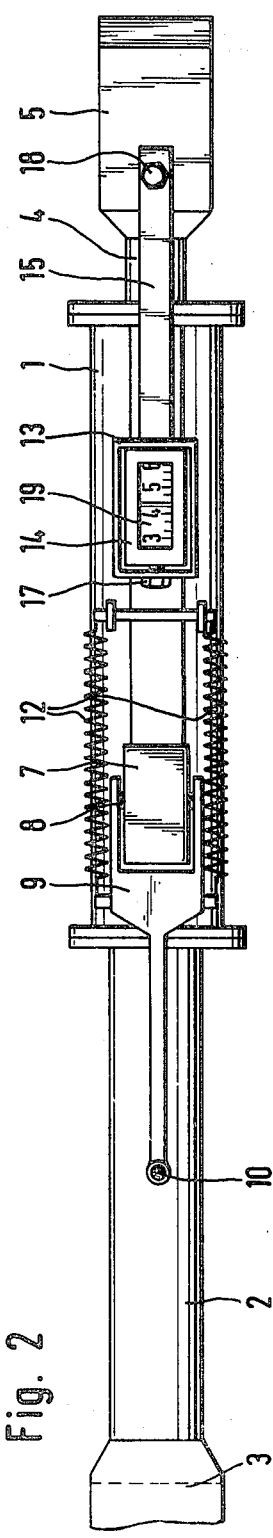

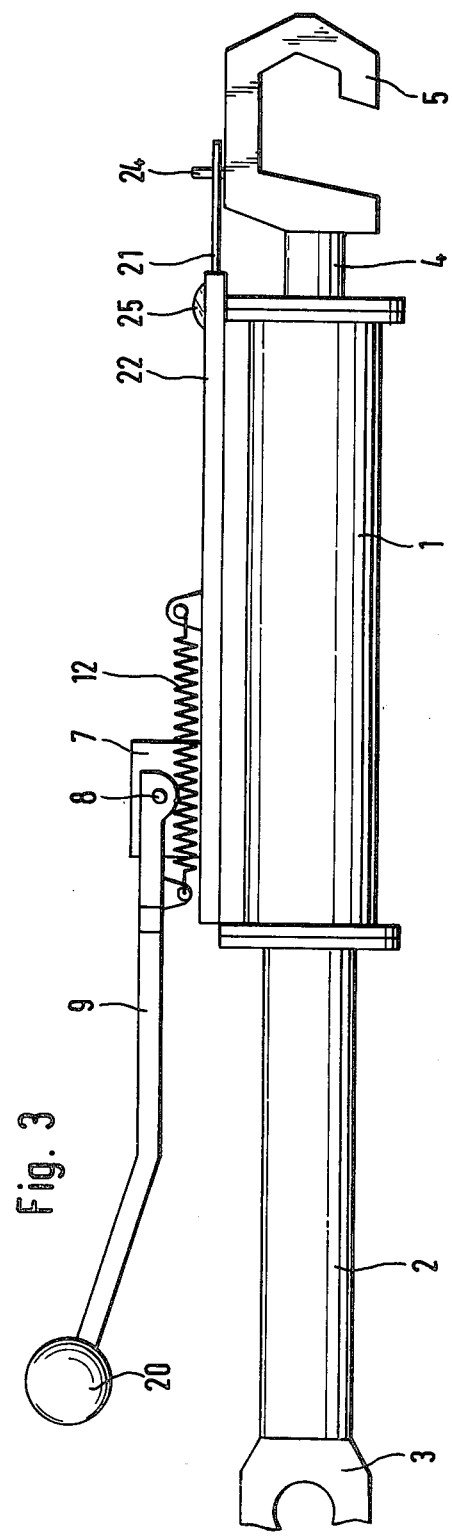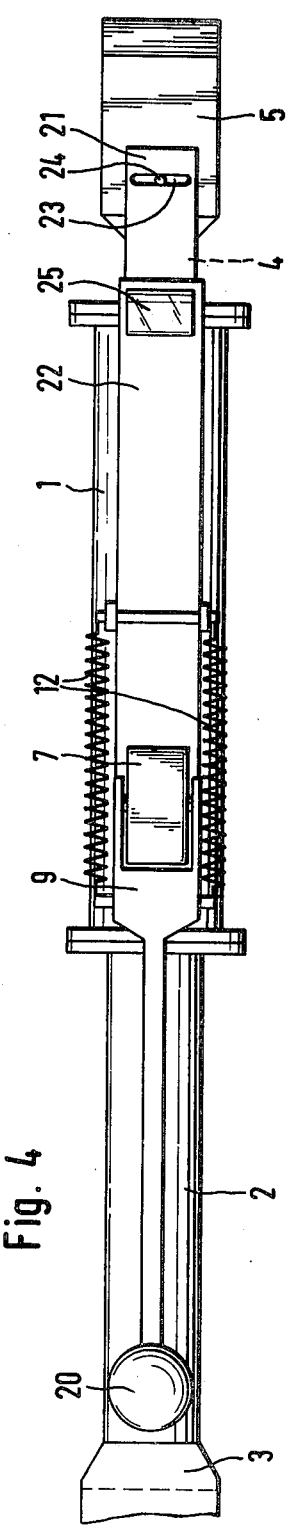

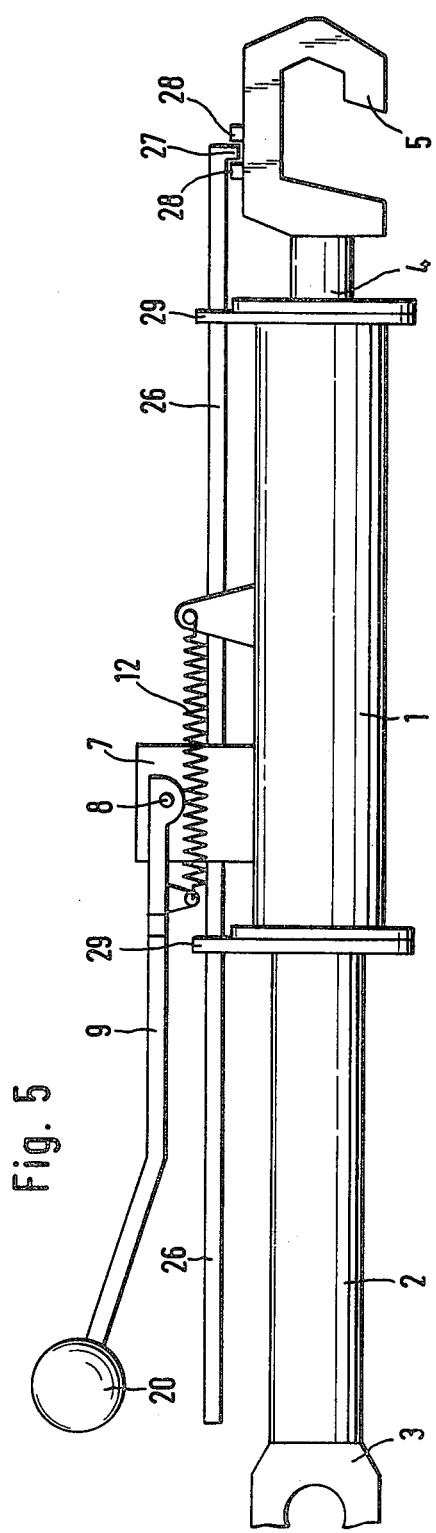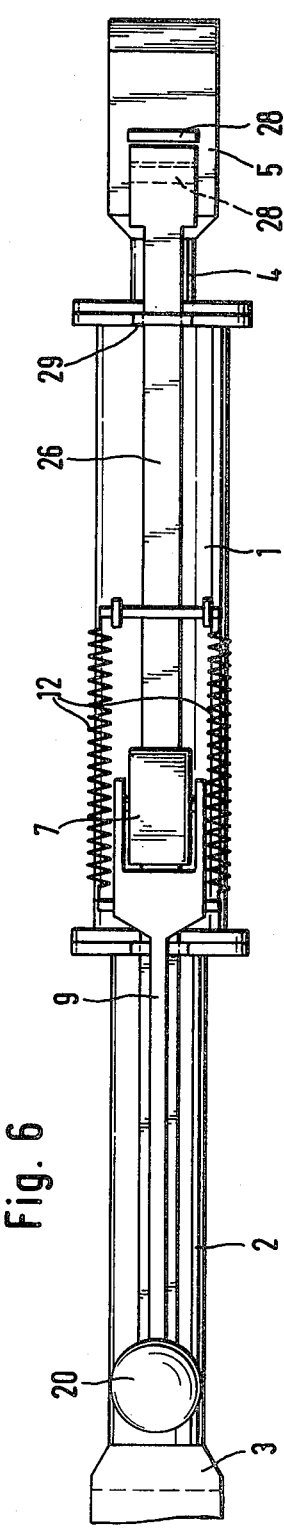

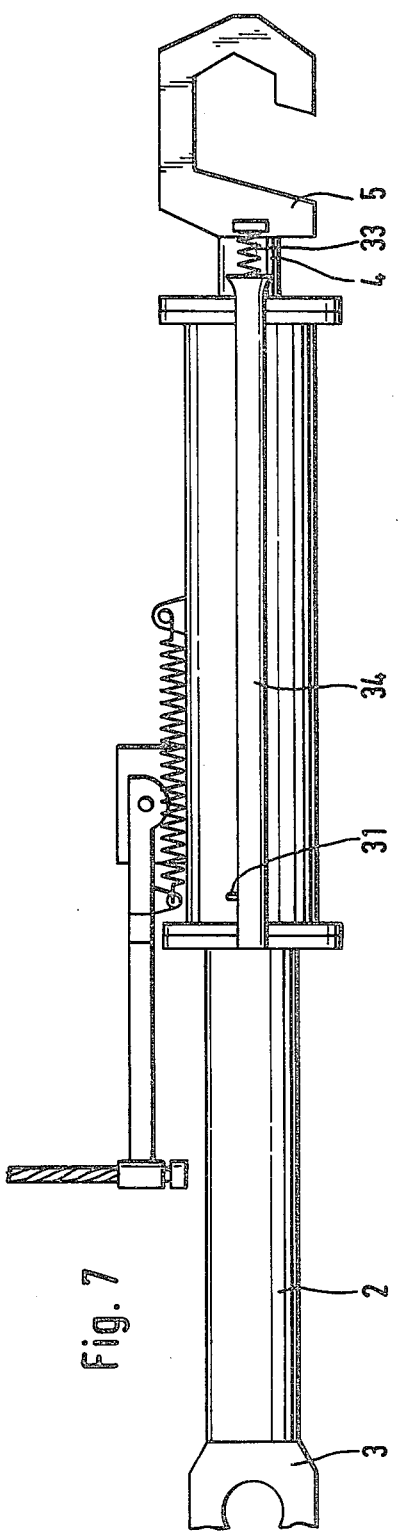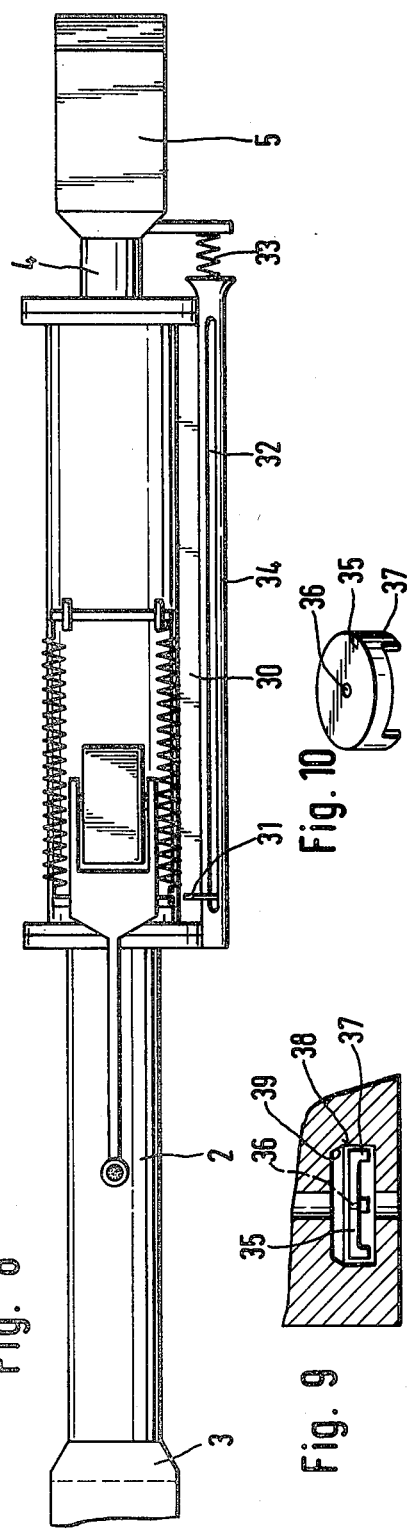

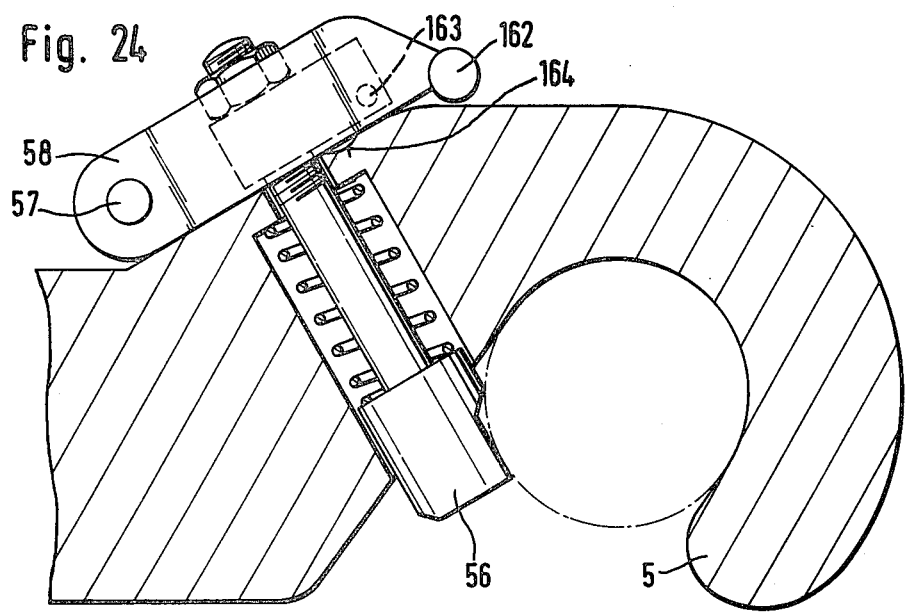
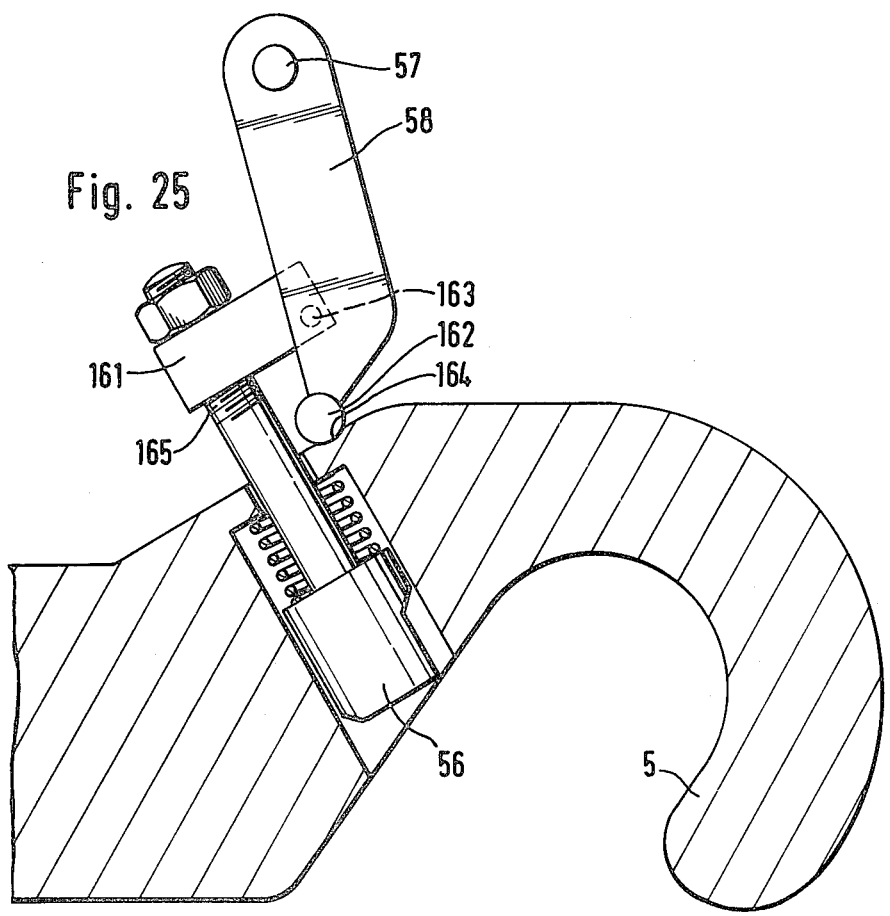

THREE POINT SUSPENSION DEVICE FOR TRACTORS

FIELD OF INVENTION

This invention relates to an adjustable upper link in a three-point suspension device for a tractor, the said link having a locking device consisting of a double-acting hydraulic cylinder and a line, provided with a shut-off device, which connects the two end-faces of the said hydraulic cylinder.

BACKGROUND OF INVENTION

This adjustable upper link was disclosed in German Utility Model No. 78 37 172.9. The length of the upper link may be adjusted by opening the locking device, whereby different agricultural implements may be adapted to the tractor, or one implement may be set in various operating positions. After the shut-off device has been locked, the set length of the upper link no longer varies, even under considerable shocks.

SUMMARY OF INVENTION

It is the purpose of this invention to simplify the operation of this adjustable link, in such a manner that adjustment may be carried out effortlessly from the tractor-seat.

The invention consists in that the shut-off device is a ball-cock, the shaft of which, carrying the ball, is connected to a fork, and in that springs engage with the prongs of the said fork, urging the fork into the shut-off position.

If a ball-cock is used as the shut off device, accurate sealing of the line between the end-faces of the hydraulic cylinder is obtainable and, once the upper link has been adjusted, the length thereof never alters. The use of a ball-cock also simplifies the operation, in that the shut-off device can be actuated merely by rotating the ball in the cock. This rotation is effected by means of a fork which the tractor-driver can grasp from his seat, if the handle is made long enough. The fork is urged towards the shut-off position by means of a spring, so that even under rugged conditions, the fork, and therefore the ball, remain in the closed position without manual interventioin.

Operation of the device is still further simplified by attaching to the fork a cable, which runs to the tractor cabin and is in immediate reach of the driver.

Operation is even further simplified if extension of the link takes place more slowly than retraction since, if an implement supported by the three-point suspension is to be lowered by extending the link, it is desirable for the link to be extended slowly, so that the implement is not dropped heavily onto the ground. The difference in the speed of adjustment may be achieved by fitting a restriction into an expansion in the line to the ball-cock, the said restriction comprising a fine bore at its centre and extensions on one end-face, a sealing-seat being formed in the said expansion and being arranged on the side of the restriction remote from the said extensions, the said restriction being located in the direction of flow of the pressure-medium as it flows when the upper link is extended.

Adjustment of the upper link may also be facilitated in that a scale is displaceable in a guide secured to the hydraulic cylinder, the end of the said scale being secured axially and displaceably to the piston-rod, or to a device carried thereby. This scale makes it a simple matter to determine how far the piston-rod has been extended and to adjust it to the same position each time the same implement is hitched to the tractor.

It is particularly desirable for the scale to be in the form of a roll tape-measure having a reading slot directed radially outwardly and upwardly. In order to be able to use a conventional mass-produced tape-measure, and to install and remove it easily-since in rugged tractor operation the tape is sometimes damaged, it is desirable for the tape-measure housing to be secured to a box fitted to the hydraulic cylinder, the said box being large enough to accomodate the length of the tape-housing and the projecting end of the rolled-up tape-measure. The said box has an opening through which the tape-measure emerges, and a screw by means of which the tape-housing can be secured in the said box.

However, the said scale may also be in the form of a flat, elongated piece of metal which is displaceable in a guide and comprises, at its end, an elongated hole running at right angles to the direction of displacement, in which a pin or bolt secured to the piston-rod engages. A scale of this kind may be displaceable in a guide which is cross-sectionally U-shaped or circular, or consists of two eyes. In this case, the elongated hole provides a flexible attachment of the end of the scale to the piston-rod, since the latter may twist through plus or minus 15 degrees during operation.

Another possibility is to secure a scale to the hydraulic cylinder, to arrange for a pointer to move along the scale, and to fit to the piston-rod a spring which moves the pointer along the scale. This spring may be helical or flat.

During the time when implements are being coupled to the tractor, the ball-cock must be kept open to allow the upper link to be adjusted to the correct length. The said ball-cock is kept open by means of an actuating lever, or by pulling on a cable attached to the said lever. Now, while the work of coupling up the implements proceeds, it is desirable not to have to apply continuous tension to the cable; instead it should be possible to set the said actuating lever so that the ball-cock remains open. This may be achieved by providing a locking means for the actuating lever, to lock it in the position in which the ball-cock remains open.

It is desirable for the locking means to be in the form of a bracket fitted to the actuating lever and a hook adapted to pivot under the force of a spring, the said hook engaging with the bracket in the locking position and being fitted to the hydraulic cylinder or to the ball-cock housing, the surface of the hook adjoining the mouth thereof being curved. A locking device of this kind is easily produced and very effective. Thus a mere pull on the cable pivots and actuating lever into a position in which its bracket is engaged and held by the hook.

Now, in order that another pull on the cable, or further pivoting of the actuating lever, may suffice to release the lock, it is desirable to design the locking means in such a manner that the pivotable hook carries a rocker adapted to pivot between two settings, the said rocker being provided with a recess which also forms a mouth engaging the bracket in one position and which has an edge which closes the mouth of the hook in the other position and provides a sliding surface for the said bracket.

For reasons of design simplicity and operating reliability, however, it is desirable for one lateral surface of the mouth of the rocker, and the edge of the mouth of the hook against which the spring-loaded bracket bears, to cover each other in the locking position.

It is also desirable to provide a locking means to secure the coupled-on or suspended implement. According to the invention, this is accomplished by providing the attachment hook with a hole in which a springloaded locking pin, pushed in front of the mouth of the attachment hook, is displaceably mounted.

According to one particularly advantageous design of this arrangement, the locking pin carries, on the side remote from the mouth of the attachment hook, a handle fitted to one end of a link or bracket which is mounted pivotably at the end of the locking pin, the length thereof, on the side remote from the handle, being such that it is in a position parallel with the locking pin, the free end of which it holds in a position such that the mouth of the locking pin is open.

In this way, the said locking means is kept unlocked, without human intervention, merely by setting a link or bracket.

In the design comprising a bracket, it is desirable for the ends thereof to be bridged over by a laterally fitted connecting piece. This provides considerable stability.

This design is quite simple if the bores in the attachment hook and locking pin are stepped and a compression spring is fitted between the shoulders.

In one particularly advantageous example of embodiment, the link or bracket carries, at the end remote from the grip, a roller, the axis of which is arranged in parallel with the axis of the bearing, the bearing of the link or bracket being accommodated, with a block secured to the locking pin, externally of the axis thereof, the distance between the axis of the bearing and the axis of the locking pin being greater than, or equal to, the distance between the axis of the roller and the axis of the said locking pin when the roller bears thereon. This is a simple way of ensuring that the locking pin is automatically held in the unlocked position.

This design may be still further improved by providing the attachment hook with a notch adjacent the locking pin, into which the roller drops.

For the purpose of facilitating assembly and simplifying adjustment, it is desirable for the locking pin to be threaded, and for the block to be secured to the locking pin by means of this thread. This may be achieved, for example, by providing the block with an internal thread corresponding to the external thread of the locking pin. The block is then screwed to the thread on the locking pin and is secured with a lock-nut.

In order to facilitate handling of the upper link, it is desirable for the piston-rod to pass through both end-faces of the hydraulic cylinder and to carry at one end a means of attachment, preferably a hook and, at the other end, a closed piece of pipe which is attached air-tightly to one end-face of the hydraulic cylinder, the other end-face carrying another means of attachment, preferably a hinge or hook, and for this piece of pipe to be filled with compressed air and to comprise a filler-valve. The compressed air thus pushes the piston-rod in one direction, thus making it easy to adapt the length of the upper link to the distance required between the tractor and the implement coupled thereto.

BRIEF DESCRIPTION OF DRAWINGS

The essence of the present invention is described in greater detail hereinafter, in conjunction with the examples of embodiment illustrated diagrammatically in the drawings attached hereto, wherein:

FIG. 1 is a side elevation of a design comprising a roll tape-measure

FIG. 2 is a plan view of a design comprising a roll tape-measure;

FIG. 3 is a side elevation of a design comprising a scale displaceable in a guide;

FIG. 4 is a plan view of a design comprising a scale displaceable in a guide;

FIG. 5 is a side elevation of a design comprising a scale displaced in eyes;

FIG. 6 is a plan view;

FIG. 7 is a side elevation of a design comprising a pointer displaced by a spring;

FIG. 8 is a plan view;

FIG. 9 is a cross-section through the restriction in the line to the ball-cock;

FIG. 10 is an enlarged view of the restriction;

FIG. 24 is a view of another attachment hook with the locking pin in the locked position; and, FIG. 25 is a section through the object in FIG. 24 in the unlocked position.

DESCRIPTION OF PREFERRED EMBODIMENTS

Figure 11:
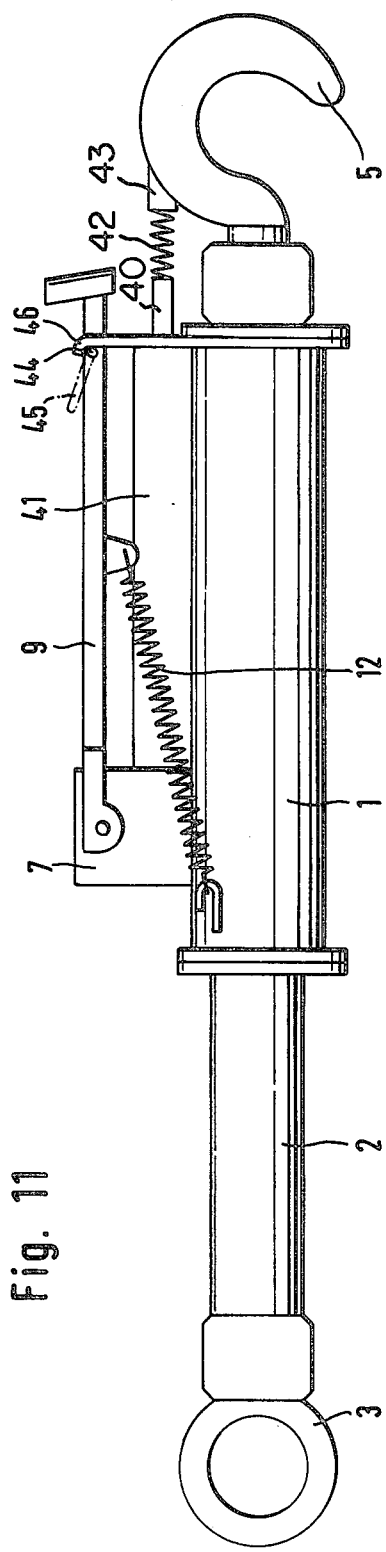
FIG. 11 is a side elevation of another design.

The upper link in a three-point-suspension device for a tractor consists of double-acting cylinder 1 to which is flanged a sleeve 2 at the end of which is located an eye or fork 3 for attachment to a bearing point on the tractor. Cylinder 1 contains a moving piston-rod 4 which generally also extends into sleeve 2. The end of the said piston-rod carries a hook 5 for attachment of the implement to be suspended. The two end-faces of the hydraulic cylinder are connected to each other by a line 6 adapted to be shut off by a ball-cock 7 comprising a shaft 8 to which the ball is attached. Secured to shaft 8, for the purpose of rotating the ball, is a fork 9 to the end of which is secured a cable 10 running to the tractor cabin. Fitted to fork 9 are two extensions 11 engaging two helical springs 12 which urge fork 9 into its locking position.

In the design illustrated in FIGS. 1 and 2, hydraulic cylinder 1 carries a box 13 accommodating a roll tape-measure 14. In order to allow the tape-measure to emerge, the said box comprises an aperture 16. In order to ensure that tape-measure housing 14 is securely seated in box 13, a clamping screw 17 is provided. Roll tape-measure 15 is secured to hook 5 by means of screw 18. Since a reading slot is provided in the top of housing 14, the tape is easy to read.

Since hook 5 may twist by about plus or minus 15 degress in operation, the use of a roll tape-measure is highly appropriate since it can absorb this twisting without damage. Accommodating tape-measure housing 14 in box 13 makes it easily replaceable, merely by loosening screws 17,18 and tightening them up again.

In the design according to FIGS. 3 and 4, the end of the stem of fork 9 carries a spherical grip 20 which the tractor-driver grasps and raises in order to shift ball-cock 7 from the locked to the open position for the purpose of altering the length of the upper link.

This design uses a displaceable scale 21 in the form of a flat bar running in a guide 22 and carrying at its end an elongated hole 23 through which a pin 24 is passed and secured to hook 5. The scale is read through a cylindrical lens 25 arranged thereabove.

In the design according to FIGS. 5 and 6, scale 26 is in the form of a cross-sectionally square or rectangular bar, the end of which carries an extension 27 engaging in a groove 28 in hook 5. This groove also provides a flexible attachment, since the end of the scale is firmly secured to piston-rod 4 by the extension 27 engaging in groove 28 on the hook 5, but this permits some twisting of piston-rod 4 and hook 5. In this case, the said scale runs in two eyes 29 secured to hydraulic cylinder 1. As in the other designs, lenses 25 are provided to assist in reading the scale.

In the design according to FIGS. 7 and 8, scale 30 is secured to hydraulic cylinder 1. A pointer 31 runs in a guide 32 along the scale and is connected to the piston-rod by means of a spring 33, the other end of which is secured to hook 5 carried by the piston-rod. A tubular guide 34 is provided for the said spring, the said guide being flared at the end adjacent hook 5, so that pointer 31 is correctly displaced even if the spring is bent.

The flow of oil is restricted in one direction by means of a disc 35, the central area of which has at least one fine bore while the end-face carries extensions 37 (FIGS. 9 and 10). A seat 39 is provided for this disc in an expansion 38 in the line running to ball-cock 7. This sealing seat is located in the direction of flow of the pressure-medium as it flows when the upper link is being extended, at which time the said pressure-medium is forced to flow through fine bore 36, since disc 35 is resting upon its seat 39, and the pressure-medium cannot therefore flow over the edge of the disc. However, disc 35 does not restrict the flow in the other direction, since extensions 37 allow the pressure-medium to flow around the edge of the disc and through them into the line.

Figure 12:
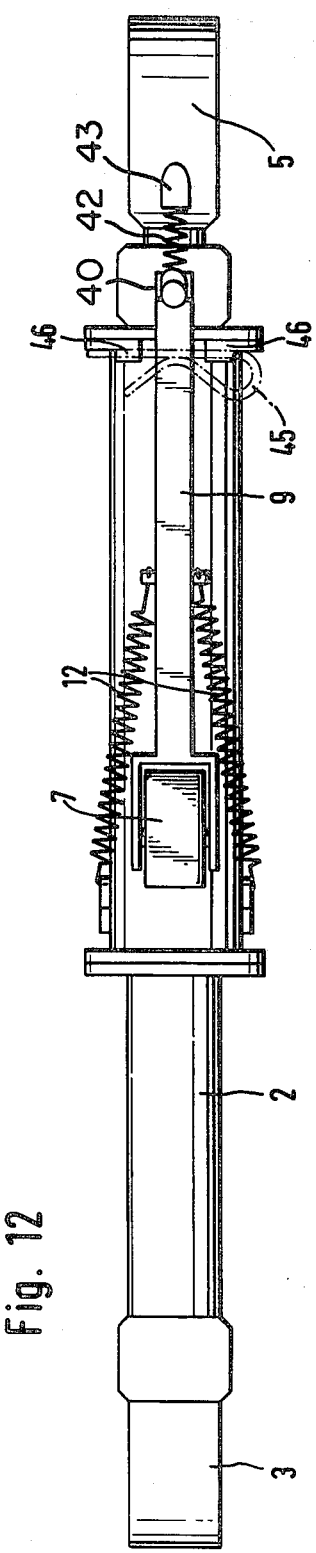
FIG. 12 is a plan view of the design according to FIG. 11.

Still another design of the object of the invention is illustrated in FIGS. 11 and 12. In this case, the scale is in the form of an elongated metal part 40 adapted to be inserted into a guide 41 which also serves as a cover for the hydraulic lines and carries the housing containing ball-cock 7. The other end of the scale is secured, through a helical spring 42, to an extension 43 on hook 5. The use of a helical spring allows bearing eye 3 to rotate axially in relation to hook 5 without damaging scale 40. Helical spring 42 may also be replaced by a piece of rubber as a compensating element.

A spring insert 45 may be used to lock lever 9 which actuates the ball-cock in its housing. The straight part of the said insert is passed through a hole 44 in the stem of fork 9 and engages with hooks 46 secured to hydraulic cylinder 1. The section of the curved part of the insert adjacent the said straight part engages in the space between the two hooks 46 and is thus held and positioned.

Figure 13:
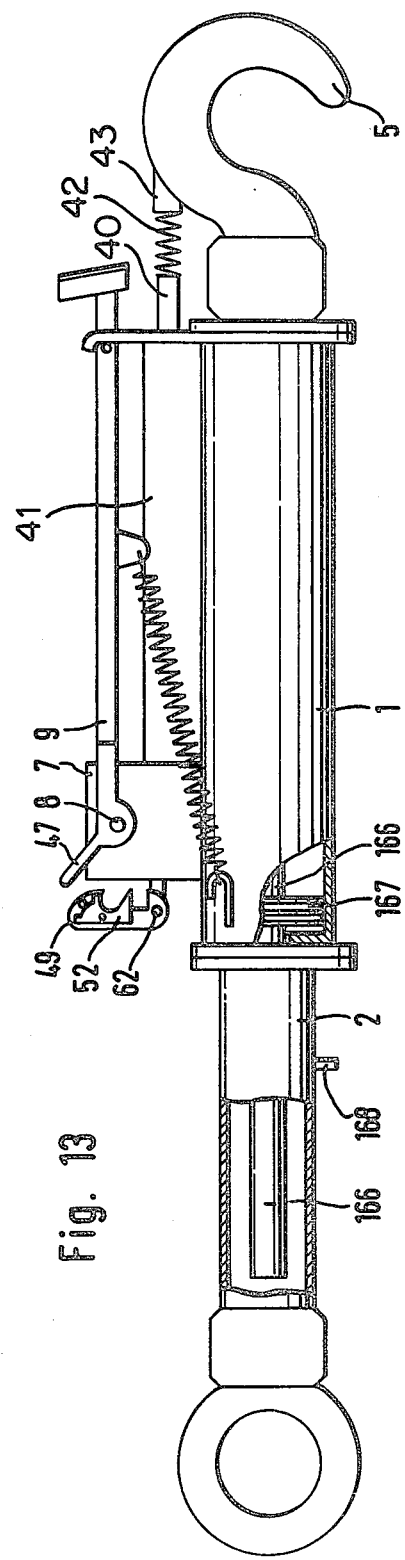
FIG. 13 is a design of the upper link with a device for locking the actuating lever in the closed position. In this figure the locking device is inoperative.
Figure 15:
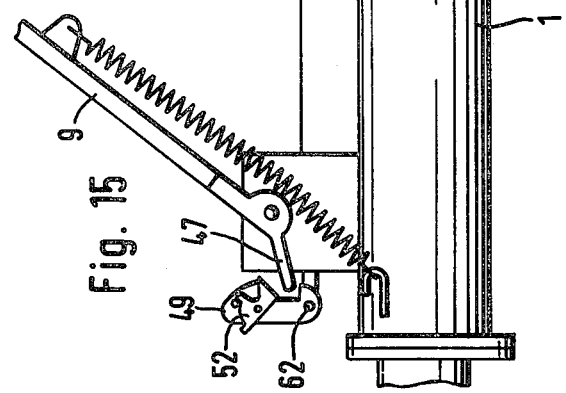
FIG. 15 shows the upper link in FIG. 13 with the actuating lever in a position for unlocking.
Figure 14:
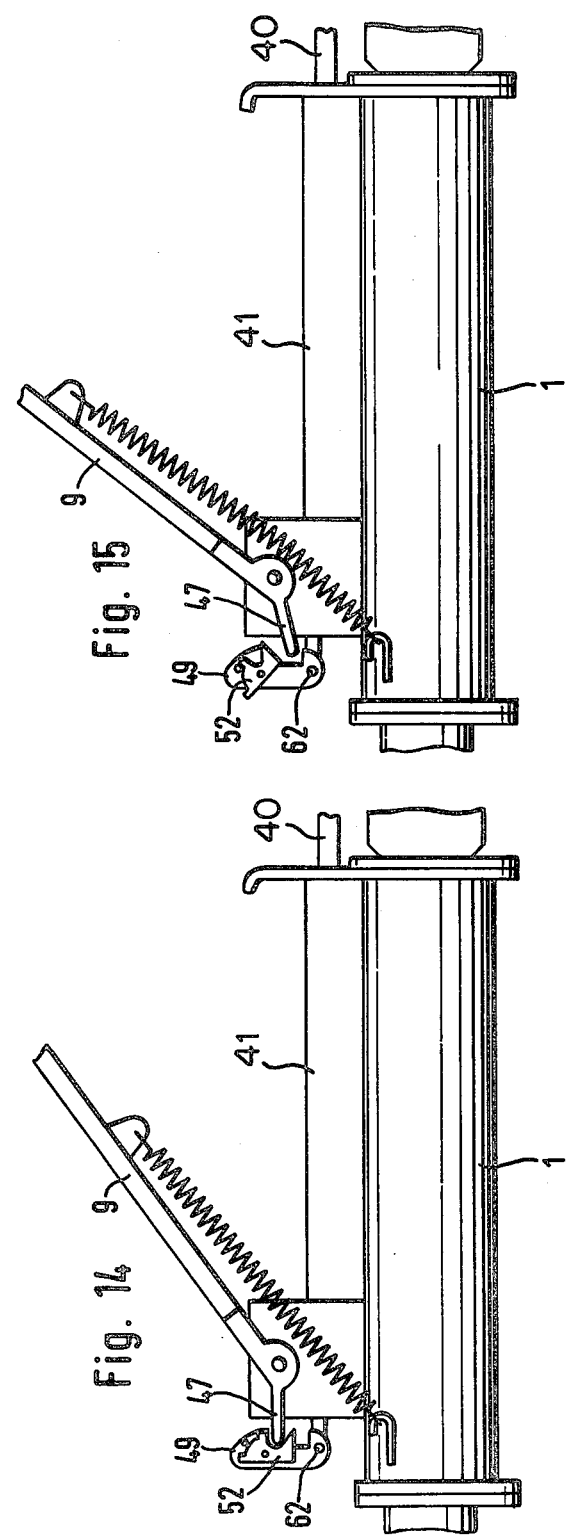
FIG. 14 shows the upper link in FIG. 13 with the actuating lever locked in the open position.
Figure 16:
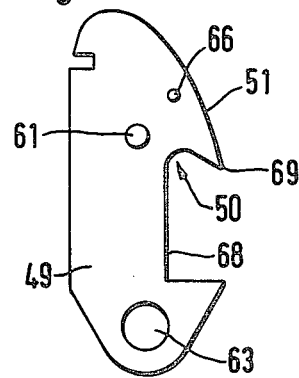
FIG. 16 is a view of the locking-device hook.
Figure 17:
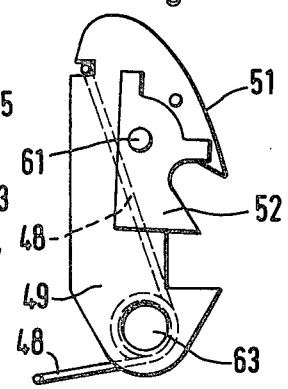
FIG. 17 is a view of the locking-device rocker.
Figure 18:
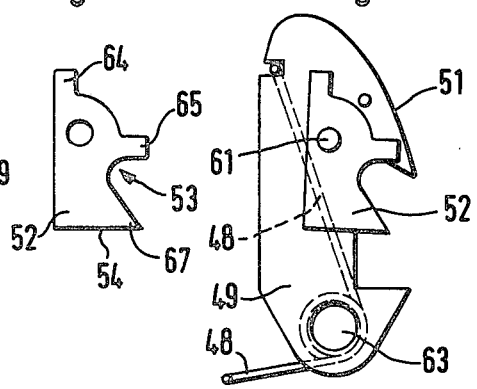
FIG. 18 shows the assembled locking device in an inoperative position.

Secured to hydraulic cylinder 1 is the housing for ball-cock 7 with its axis 8 about which actuating lever 9 pivots. As shown in FIG. 13, the said actuating lever carries a bracket 47 used to lock it. This locking device consists of a hook 49 adapted to pivot about a pin 62 and forced towards the ball-cock housing by a spring 48. Pin 62 is mounted upon hydraulic cylinder 1, or in the housing of ball-cock 7, and passes through hole 63 in pivotable hook 49. The structural configuration is such that the locking device consists of a bracket 47 fitted to actuating lever 9 and of a hook 49 adapted to pivot under the force of a spring 48; the mouth 50 of the said hook engaging, in the locked position, over bracket 47 and being fitted to hydraulic cylinder 1 or to the housing of ball-cock 7, and surface 51 of the hook adjoining mouth 50 being curved. This curved surface 51 allows bracket 47, when actuating lever 9 is pivoted, to pivot hook 49 against the force of spring 48, whereupon mouth 50 can engage over bracket 47 and soon as the latter reaches the level of the said mouth. Lever 9 is preferably actuated by means of a cable. The locking device then snaps hook 49 over bracket 47.

Figure 19:
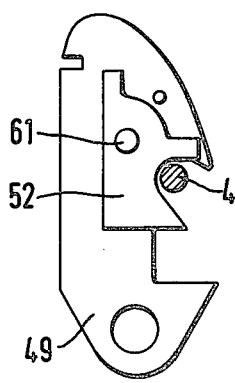
FIG. 19 shows the locking device with the actuating-lever bracket locked.
Figure 20:
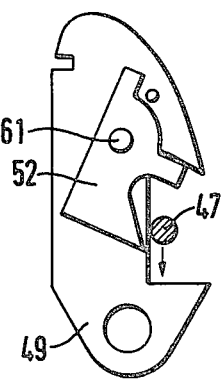
FIG. 20 shows the locking device in the unlocked position.
Figure 21:
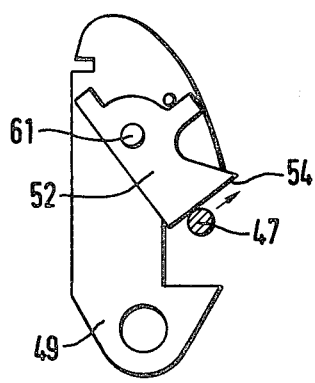
FIG. 21 shows the locking device in the position when the rocker is moved back.

In order to unlock the device, hook 49 must be pivoted back. This is easily accomplished by fitting to the said hook a rocker 52 adapted to pivot about a pin 61. Further pivoting of actuating lever 9 causes this rocker to drop into a position which allows bracket 47 to slide out of mouth 50 of hook 49, as soon as the pull on the cable which actuates lever 9 ceases. Pin 61 is secured to the pivotable hook. The structural configuration is preferably such that pivotable hook 49 carries a rocker 52 adapted to pivot between two positions, the said rocker having a recess 53 which also constitutes a mouth accommodating bracket 47 in the one position, and also having an edge 54 which, in the other position, closes off mouth 50 of hook 49 and constitutes a sliding surface for bracket 47. Rocker 52 has two stops 64,65 which limit its ability to pivot. A pin 66, inserted firmly into pivotable hook 49, serves as a counterstop. The one terminal position of the said rocker is characterized in that projection 67 has moved back behind edge 68 of the hook, whereas the other terminal position is characterized in that edge 54 closes mouth 50 of the hook and tip 69 projects when mouth 50 strikes the curved surface 51. FIG. 19 shows the position in which bracket 47 is held in the mouth 50 of the hook. In FIG. 20, actuating lever 19 has been pivoted still further, so that the rocker is no longer in contact with the bracket. FIG. 21 shows the position of the rocker in which mouth 50 of the hook is closed. This position is achieved when the pull on the cable which has pivoted actuating lever 9 ceases, and the said lever is pulled back by the action of spring 12. At this time, bracket 47 strikes lower edge 54 of the rocker, namely the edge which, when the actuating lever is moved back, causes the said rocker to rotate and thus to close off mouth 50 of the hook.

It is desirable for one lateral surface of the mouth of the rocker, and the edge of the mouth of the hook upon which the bracket bears under the action of spring 12, to cover each other in the locking position.

Figure 22:
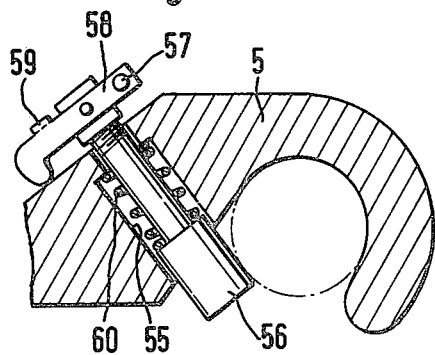
FIG. 22 is a section through the attachment hook with the locking pin in the locked position.
Figure 23:
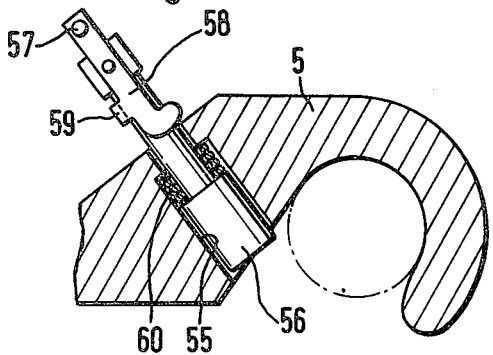
FIG. 23 is a section through the attachment hook with the locking pin in the unlocked position.

In order to ensure reliable attachment of the implements it is desirable for the attachment hooks to be provided with locking pins 56 (FIGS. 22 and 23. Such pins should secure a ball, or the like means of attachment, inserted into attachment hook 5, as far as possible without further aids. To this end a spring 60 holds the locking pin in the closed position. Since the locking pin is in the way when an implement is being coupled up or uncoupled, the locking pin is adapted to be held in the open position at these times. This is accomplished by fitting the locking pin with a grip 57 on the end remote from the mouth of attachment hook 5. This grip is mounted at one end of a link 58 mounted pivotably upon the end of the locking pin, the length of the end remote from the grip being such that it assumes a position parallel with the locking pin and holds the free end in a position in which the mouth of the attachment hook is open. In this connection it is desirable for the ends of link 58 to be bridged by a laterally fitted connecting piece.

A structurally simple design of this kind is obtained by stepping bore 55 of attachment hook and locking pin 56 and fitting a compression spring 60 between the shoulders. The end of locking pin 56 is threaded to accept a block having a bore and internal thread which carries the bearing for link or bracket 58.

FIGS. 24 and 25 show another design of locking means for pin 56. In this case, bearing 163 for link or bracket 58 is accommodated in a block 161 secured to locking pin 56 externally of the axis thereof, the distance between the axis of bearing 163 and the axis of locking pin 56 being greater than, or equal to, the distance between the axis of roller 162 and the axis of the locking pin when the said roller is bearing thereon. The distances of bearing 163 and roller 162 from the axis of locking pin 56 already guarantees that pin 56 will be effectively held in the unlocked position, but this may be still further improved by providing a depression 164 in attachment hook 5, close to the locking pin, into which roller 162 drops.

According to a particularly favourable example of embodiment, which is easy both to produce and assemble, locking pin 56 carries a thread 165 to receive a nut by means of which block 161 is secured to the said locking pin.

FIG. 13 shows, partly in section, the position of piston-rod 166 and of piston 167. The length of tube, into which piston-rod 166 projects, contains a compressed-air filler-valve 168 allowing the interior of the length of tube to be filled with compressed air or nitrogen, preferably at a pressure of between 6 and 12 atmospheres. This provides a design in which both ends of the piston-rod pass through the end-faces of the hydraulic cylinder, one end carrying an attachment means, preferably a hook 5 and the other end projecting into a closed length of tube, one end of which is sealed to the end-face of the hydraulic cylinder, while the other end carries a further means of attachment, preferably a hinge or a hook, the said tube being filled with compressed air and comprising a filler-value 168. As a result of this, the piston-rod, and thus hook 5, are automatically displaceable without springs, which makes it extremely simple to adjust the upper link to the desired length.

What is claimed is:

1. An adjustable upper link of a three-point suspension device for a tractor having a seat, said link comprising a double-acting hydraulic cylinder, a piston reciprocable in said cylinder and having a piston rod extending from the cylinder, coupling means on said piston rod and on an end of said cylinder opposite said piston rod, a hydraulic line connecting opposite end portions of said cylinder with one another, a shut-off valve in said line comprising a rotatable valve member having a shaft, an actuating lever fixed on said shaft and operable by an operator on the tractor seat, spring means acting on said lever to bias said valve to closed position and means for releasably holding said lever in open position of said valve comprising catch means engageable with said lever upon movement of said lever a predetermined distance in a direction to open said valve to hold said lever in open position and means for releasing said lever from said catch means upon further movement of said lever in said direction.

2. An adjustable upper link according to claim 1, in which said catch means comprises a pivoted hook, having a mouth to receive said lever, and means for biasing said hook in a direction to engage said lever, and in which said release means comprises a rocker on said hook movable between a position in which it closes said mouth of said hook and a position in which the mouth of said hook is open.

3. An adjustable upper link according to claim 1, in which said lever has one arm operable by said operator and a second shorter arm engageable by said catch means.

4. An adjustable upper link according to claim 1, in which a flexible tension line attached to said lever extends to a location adjacent said tractor seat in position to be operated by said operator to open and close said valve.

5. An adjustable upper link according to claim 1, in which said line comprises means for restricting flow of fluid in one direction only, said restricting means comprising a disc having a fine bore, a seat on which said disc seats when a flow of fluid is in said one direction, whereby flow of fluid is only through said bore, and means for maintaining said disc unseated when a flow of fluid is in the opposite direction to permit flow of fluid around said disc.

6. An adjustable upper link according to claim 1, in which means for securing said actuating lever in closed closed condition of said value comprises two hooks projecting up from said cylinder on opposite sides of said lever and a hair-pin spring clip having one straight leg and one curved leg, said straight leg passing transversely through a hole in said lever and said curved leg being received between said hooks to retain said clip in place.

7. An adjustable upper link according to claim 1, in which said coupling means on said piston rod comprises a hook having a bore therein, a pin in said bore movable between open and closed positions, spring means acting on said pin to bias it toward closed position and a link pivotally mounted on said pin and movable between a position in which it lies approximately parallel to said pin and engages said hook to hold said pin in open position and a position in which it extends transversely of said pin and releases said pin for movement to closed position by said spring means.

8. An adjustable upper link according to claim 7, in which said link has a transverse roller at an end engageable with said hook.

9. An adjustable upper link according to claim 8 in which said hook has a depression to receive said roller.

10. An adjustable upper link according to claim 7, in which an end of said pin is threaded for securing thereon a block on which said link is pivotally mounted.

11. An adjustable upper link according to claim 1, in which said piston has two piston rods extending out of opposite ends of said cylinder with one of said coupling means on one of said piston rods, the other of said piston rods being received in a closed cylindrical sleeve forming an extension of said cylinder and on the outer end of which the other of said coupling means is provided.

12. An adjustable upper link according to claim 11, in which means is provided for filling said sleeve with compressed gas.

13. An adjustable upper link of a three-point suspension device for a tractor having a seat, said link comprising a double-active hydraulic cylinder, a piston reciprocable in said cylinder and having first and second piston rods extending respectively from first and second ends of said cylinder, a sleeve extending from said first end of said cylinder and enclosing said first piston rod, coupling means provided on said sleeve and on said second piston rod, a hydraulic line connecting opposite end portions of said cylinder with one another, a shut-off valve in said line comprising a rotatable valve member having a shaft, an actuating lever fixed on said shaft and operable by an operator on the tractor seat, spring means acting on said lever to bias said valve to closed position and means operable by an operator on said tractor seat for releasably holding said lever in open position of said valve.

14. An adjustable upper link according to claim 10, in which said sleeve is provided with means for filling said sleeve with gas under pressure.

15. An adjustable upperlink of a three-point suspension device for a tractor having a seat, said link comprising a double-acting hydraulic cylinder, a piston reciprocable and rotatable in said cylinder and having a piston rod extending from the cylinder, connecting means on said piston rod and on an end of said cylinder opposite said piston rod, a hydraulic line connecting opposite end portions of said cylinder with one another, a shut-off valve in said line comprising a rotatable valve member having a shaft, an actuating lever fixed on said shaft and operable to rotate said valve member between an open position permitting relative axial movement of said cylinder and piston and a closed position blocking such axial movement but permitting relative rotary movement, calibrated measuring means mounted on said cylinder for longitudinal movement relative thereto, means on said cylinder for guiding said measuring means in such movement and means coupling said measuring means with said connecting means on said piston rod for movement of said measuring means longitudinally relative to said cylinder while permitting limited rotary movement of said piston rod and connecting means thereon relative to said cylinder.

16. An adjustable upper link according to claim 15, in which said measuring means comprises a flexible steel tape, a tape housing mounted on said cylinder and receiving one end portion of the tape in coiled condition, and means securing the other end of said tape to said connecting means on said piston rod, said tape housing having an aperture through which calibrations on said tape can be read.

17. An adjustable upper link according to claim 15, in which said measuring means comprises an elongate bar extending lengthwise of said cylinder, means on said cylinder guiding said bar in lengthwise movement and means coupling an end of said bar to said connecting means on said piston rod to transmit lengthwise movement to said bar while permitting said connecting means to rotate relative to said cylinder.

18. An adjustable upper link according to claim 15, in which said measuring means comprises a scale secured to said cylinder, a pointer running in a guide extending along said scale and a spring connecting said pointer with said connecting means on said piston rod.

19. An adjustable upper link of a three-point suspension device for a tractor, said link comprising a doubleacting hydraulic cylinder, a piston reciprocable in said cylinder and having a piston rod extending from the cylinder, coupling means on said piston rod and on an end of the cylinder opposite said piston rod, a hydrualic line connecting opposite end portions of the cylinder with one another, a shut-off valve in said line comprising a rotatable valve member having a shaft and an actuating lever fixed to said shaft and operable to rotate said valve member between an open position permitting relative axial movement of said cylinder and piston and a closed position blocking such axial movement, at least one of said connecting means comprising a hook having a bore therein, a pin in said bore movable between open and closed condition of said hook, spring means acting between said hook and said pin to bias said pin toward closed condition and a link pivotally mounted on said pin for movement between a position in which said link lies approximately parallel to said pin and engages said hook to hold said pin in open condition and a position in which said link extends transversely of said pin and thereby releases said pin for movement to closed condition by said spring means.

20. An adjustable upper link according to claim 19, in which said link has a roller nose engageable with said hook and in which said hook has a depression to receive said roller nose.

21. An adjustable upper link according to claim 19, in which an end of said pin is threaded for securing thereon a block on which said link is pivotally mounted.

* * * * *